Sept. 29, 1925.
H. P. KRAFT
VALVE
Filed April 29, 1922
1,555,013
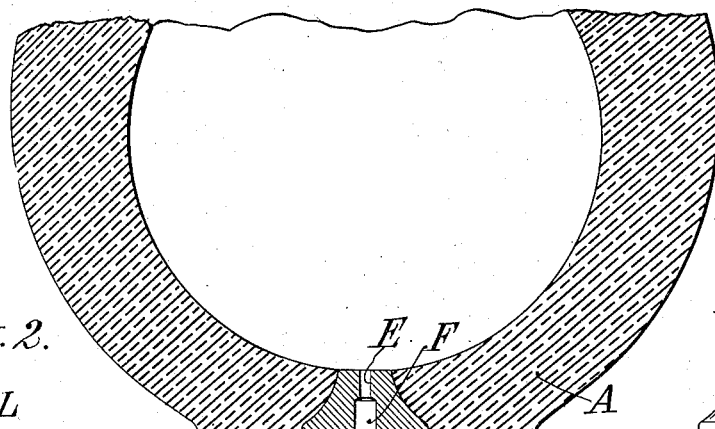
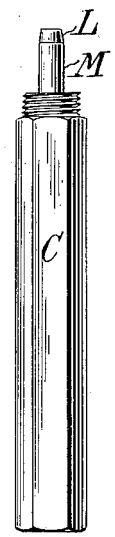
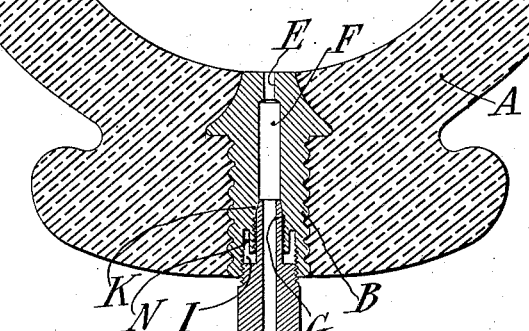
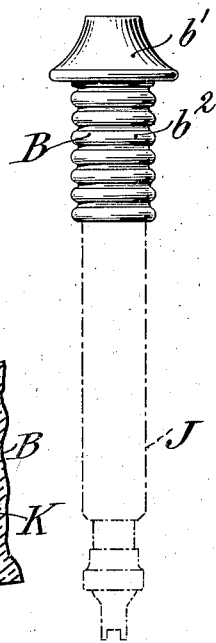
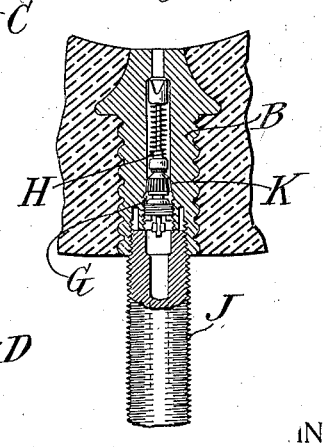
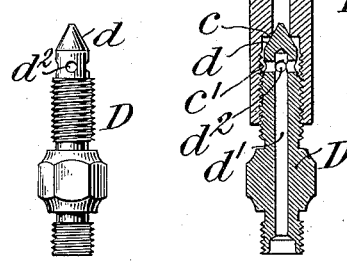
INVENTOR:
Henry Phillip Kraft,
By Attorneys, Patented Sept. 29, 1925.

1,555,013

UNITED STATES PATENT OFFICE.

HENRY PHILLIP KRAFT, OF RIDGEWOOD, NEW JERSEY; EDGAR J. PHILLIPS AND EARL A. DARR EXECUTORS OF THE WILL OF SAID HENRY P. KRAFT, DECEASED.

VALVE.

Application filed April 29, 1922. Serial No. 557,279.

*To all whom it may concern:*

Be it known that I, HENRY PHILLIP KRAFT, a citizen of the United States of America, residing in Ridgewood, in the county of Bergen and State of New Jersey, have invented certain new and useful Improvements in Valves, of which the following is a specification.

The present invention relates to valves, and more particularly to tire valves, and aims to provide certain improvements therein.

In certain types of tire valves known as racing valves, the valve casing is made very short so as to facilitate mounting the tire on a wheel. The tire when so mounted does not permit ready access to the valve, and an extension member is therefore connected to the valve casing for inflating and gauging the tire. The valves are connected to inner tubes in the usual manner.

According to the present invention I provide a racing valve designed for use with a single tube tire. The casing of this valve is vulcanized into place in the tire shoe, and thus serves the dual purpose of a vulcanizing valve attachment and a housing for the tire valve inside. To this end the casing is provided with an internal shoulder, which is preferably tapered, to accommodate the packing gasket carried by the valve seat of the standard valve inside and to serve as a seating face for a vulcanizing valve casing through which the vulcanizing fluids are conducted to the tire during the vulcanizing process. It is also an object of the present invention to provide a tire valve comprising a valve casing which is adapted to be substantially entirely enclosed within a tire shoe or casing. The invention also includes certain other features of improvement which will be hereinafter more fully set forth.

Referring to the drawings, wherein the preferred embodiment of my invention is illustrated,—

Figure 1 is a longitudinal section through the tire valve casing and vulcanizing valve.

Fig. 2 is an elevation of the vulcanizing valve casing.

Fig. 3 is a top plan view thereof.

Fig. 4 is an elevation of the vulcanizing valve proper.

Fig. 5 is a longitudinal section of the tire valve showing a supplemental casing connected thereto.

Fig. 6 is an elevation of the tire valve casing and a supplemental casing indicated in dotted lines.

Referring to the drawings, let A indicate a single tube tire, B a tire valve casing connected thereto, C a vulcanizing valve casing adapted to be connected to the casing B during the process of vulcanizing the valve casing to the tire, and D a plug valve for controlling the flow of the vulcanizing fluids into the tire.

The tire valve casing B is preferably embedded within and vulcanized to the body of the tire during the process of curing said tire. In the curing process as heretofore practiced it was customary to employ a vulcanizing valve attachment which was temporarily connected to the tire. With the present invention, however, such temporary attachment is dispensed with and the tire valve casing B designed to serve the dual purpose of a vulcanizing valve attachment and a permanent tire valve casing for the tire. To this end, the casing B is formed with a series of concentric bores E, F and G, adapted to receive a standard valve inside H, and an enlarged threaded bore I in advance of the others to receive the thread on a supplemental casing or part which might be either the vulcanizing valve casing C, or a racing valve extension J. Between the bores F and G there is formed a tapered shoulder K adapted to accommodate the tapered packing gasket on the valve inside H, or the tapered end L formed on a reduced extension M of the vulcanizing valve casing C. The function of the tapered shoulder is to provide a leak-tight joint with the member seating thereagainst, be it of rubber, metal or any other substance. As herein shown, there is a groove N formed between the bores G and I, and this groove is designed to receive either a packing to provide a leaktight joint between the casing B and a supplemental casing such as J, or to receive therein the end of a special form of casing as illustrated in U. S. Patent 1,251,585. To insure a positive union between the tire A and the casing B, the latter is formed with an enlarged head $b'$ and a corrugated exterior $b^2$. It will be understood, however, that the casing may have any other suitable contour, whereby the present object might be accomplished.

The vulcanizing valve proper D may be of any desired construction, although I have herein shown it as a plug valve having a reduced tapered inner end $d$ adapted to seat against an angular seat $c$ in the casing C. A passage $d'$ opening in a chamber $c'$, through transverse passages $d^2$, provides for the flow of fluid through the valve. The exterior surface of the plug valve D and the vulcanizing valve casing C are preferably of polygonal form, and thus provide wrench engaging surfaces through which force may be applied to positively seat the valve D and the tapered end L.

In Figs. 5 and 6 I have shown the valve as provided with a valve extension J. If desired, this extension may have therein a deflating pin for deflating and gauging the tire as shown in the U. S. Patent 1,251,585 aforementioned.

While I have shown and described the preferred form of my invention, it will be understood that I do not wish to be limited thereto, since various changes may be resorted to without departing from the spirit of the invention.

What I claim is:—

A vulcanizing valve casing having an external threaded portion adjacent one end which is formed as a reduced extension, the free end of said extension being tapered to engage a valve seat packing shoulder within a tire valve casing.

In witness whereof, I have hereunto signed my name.

HENRY PHILLIP KRAFT.